United States Patent [19]

Dirauf et al.

[11] Patent Number: 4,491,204

[45] Date of Patent: Jan. 1, 1985

[54] DISK BRAKE WITH RETURN, GUIDE, AND PAD-THICKNESS SENSOR SPRING

[75] Inventors: Otmar Dirauf, Pfarrweisach; Norbert Spielmann, Ebern, both of Fed. Rep. of Germany

[73] Assignee: FAG Kugelfischer Georg Schäfer & Co., Schweinfurt, Fed. Rep. of Germany

[21] Appl. No.: 353,944

[22] Filed: Mar. 2, 1982

[30] Foreign Application Priority Data

Mar. 4, 1981 [DE] Fed. Rep. of Germany ....... 3108113

[51] Int. Cl.³ ...................... F16D 65/02; G01D 21/00
[52] U.S. Cl. .................. 188/73.38; 116/208; 188/1.11; 188/250 E; 192/30 W
[58] Field of Search ............... 188/73.38, 73.37, 73.36, 188/205 A, 250 E, 1.11, 73.31, 72.3, 73.35; 116/208; 340/52 A; 192/30 V, 30 W

[56] References Cited

U.S. PATENT DOCUMENTS

| 3,638,765 | 2/1972 | Flaherty | 188/73.38 |
| 3,716,113 | 2/1973 | Kobayashi et al. | 116/208 |
| 3,986,164 | 10/1976 | Hirai et al. | 188/1.11 |

FOREIGN PATENT DOCUMENTS

| 1182087 | 11/1964 | Fed. Rep. of Germany. | |
| 1263412 | 11/1968 | Fed. Rep. of Germany. | |
| 2258050 | 5/1974 | Fed. Rep. of Germany. | |
| 2745947 | 4/1978 | Fed. Rep. of Germany | 188/73.38 |
| 2845959 | 4/1980 | Fed. Rep. of Germany. | |
| 42251 | 12/1971 | Japan | 188/73.38 |
| 28323 | 3/1981 | Japan | 188/72.3 |
| 31531 | 3/1981 | Japan | 188/72.3 |

Primary Examiner—Bruce H. Stoner, Jr.
Assistant Examiner—Robert J. Oberleitner
Attorney, Agent, or Firm—Karl F. Ross; Herbert Dubno

[57] ABSTRACT

A disk brake comprises a caliper housing adapted to fit over the edge of a brake disk rotatable about an axis, a pair of brakeshoes in the housing axially flanking the disk and each having a brake pad turned toward the respective face of the disk and a backing plate turned away therefrom, and an actuator in the housing and engaging the backing plates for urging the brakeshoes together against the disk. The backing plates are formed with respective axially throughgoing brakeshoe passages and the housing is formed with respective housing passages in line with the brakeshoe passages. The brake further has a spring compressed axially between the brakeshoes and having respective legs extending toward the shoes, respective pusher portions extending from the legs and lying flatly against the backing plates, and respective guide portions extending from the pusher portions and extending axially through the respective brakeshoe passage and housing passage. The pusher portions urge the brakeshoes axially apart and the guide portions guide the brakeshoes in the housing.

9 Claims, 12 Drawing Figures

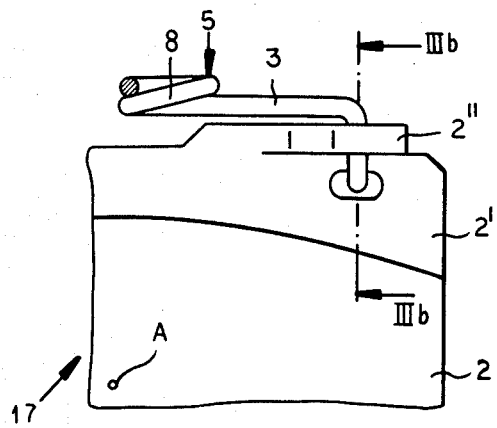
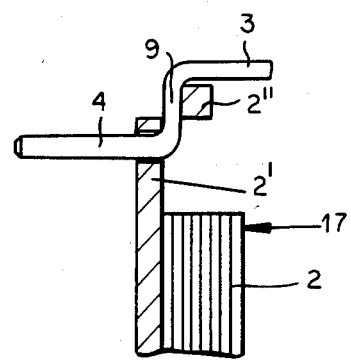
FIG.3a  FIG.3b
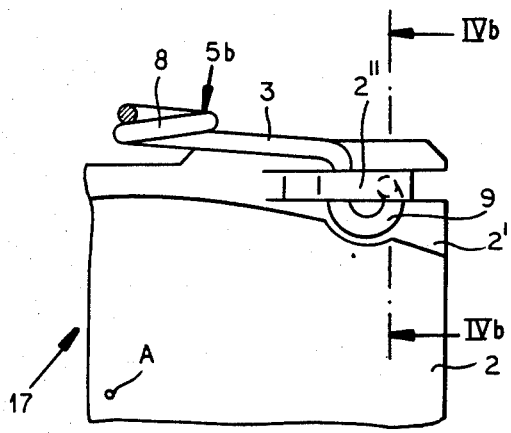
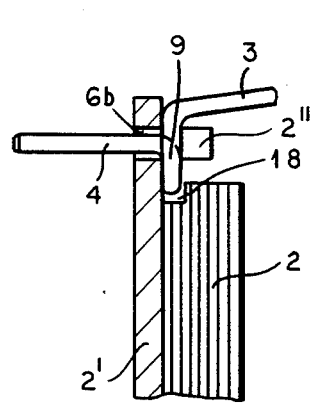
FIG.4a  FIG.4b
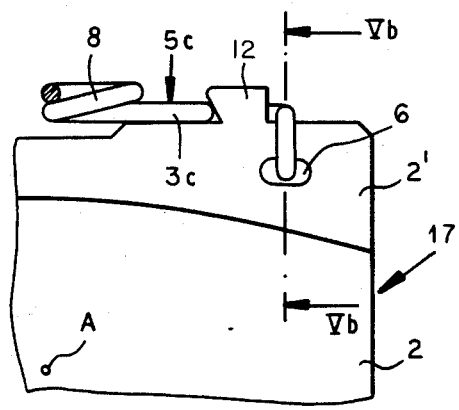
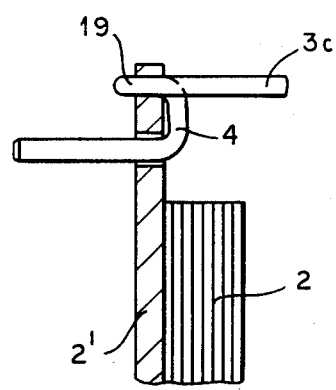
FIG.5a  FIG 5b

DISK BRAKE WITH RETURN, GUIDE, AND PAD-THICKNESS SENSOR SPRING

FIELD OF THE INVENTION

The present invention relates to a disk brake. More particularly this invention concerns a disk brake used on a wheel of an automotive vehicle.

BACKGROUND OF THE INVENTION

A standard disk brake has a caliper housing that fits over the edge of a brake disk and that is formed with a brakeshoe well aligned radially with this disk. A pair of brakeshoes in this well axially flank the disk and each have a brake pad turned toward the respective face of the disk and a backing plate turned away from it. Means such as a hydraulic piston-and-cylinder assembly built into the housing can urge the brakeshoes together against the disk for braking action.

It is standard practice, as known for example from German Pat. No. 1,263,412 filed Feb. 7, 1964 by Hans Schanz, to support the brakeshoes for axial displacement in the housing on a pair of axially extending pins. These pins are driven out to replace the brakeshoes. In such an arrangement a spring is normally provided to back the brakeshoes axially oppositely away from the disk when the braking operation is over, thereby minimizing drag on the disk and wear of the brakeshoes.

Such a return spring is seen in German Pat. No. 1,182,087 filed Dec. 5, 1962 by Hans Schanz. It is generally flat and cruciform. Two of its arms engage under the brakeshoe-support pins and the other two bear down on the brakeshoes at the front edges of the pads. Thus this spring urges the shoes apart while holding them snugly so that they do not rattle. This arrangement requires the use of a separate and relatively delicate return spring.

Another arrangement is seen in German patent document No. 2,845,959 filed Oct. 21, 1978 by Karl Fritz. Here the spring is formed of a spring-steel wire having a central bight that is hooked behind one backing plate that is specially formed, two loops at the ends of the bight that engage around the guide rods, and two legs which fit into respective generally axially open holes in the other specially formed backing plate. Such an arrangement is disadvantageous because, once again, it requires one to use a separate spring, and at the same time the two brakeshoes must be specially made to cooperate with it.

A simpler arrangement is seen in German Pat. No. 2,258,050 filed Nov. 27, 1972 and referring to U.S. Pat. No. 3,256,959. Here a simple hairpin wire spring is hooked under one of the brakeshoe-support rods and has a pair of radially inwardly bent ends that engage through slots formed in the brake pads with the backing plates so as to push the two backing plates apart. This gives effective and simple return action. In addition the spring wire is insulated, normally by being enameled, so that an electrical connection can be made from an alarm device to it. Since the pusher ends of the spring legs lie flatly against the backing plates, when the brake pad wears down to an axial thickness equal to the wire diameter, the brake disk will engage the wire, quickly wearing off its insulating covering and grounding it. When such a grounding is detected, the alarm device will signal that the brake pads are worn out. This arrangement still requires that several parts be removed and remounted each time the pads are changed, increasing the difficulty of the operation and the likelihood that something critical will be lost.

OBJECTS OF THE INVENTION

It is therefore an object of the present invention to provide an improved disk brake.

Another object is the provision of such a disk brake which overcomes the above-given disadvantages.

A further object is to provide a simplified disk brake wherein minimal structure is needed to slidably support the shoes, return them after a braking operation, and work with the warning means to signal when the pads are badly worn.

SUMMARY OF THE INVENTION

These objects are attained according to the instant invention in a standard disk brake comprising, as described above, a caliper housing adapted to fit over the edge of a brake disk rotatable about an axis, a pair of brakeshoes in the housing axially flanking the disk and each having a brake pad turned toward the respective face of the disk and a backing plate turned away therefrom, and means in the housing and engaging the backing plates for urging the brakeshoes together against the disk. The backing plates are formed with respective axially throughgoing brakeshoe passages and the housing is formed with respective housing passages in line with the brakeshoe passages. The brake of this invention has a spring compressed axially between the brakeshoes and having respective legs extending toward the shoes, respective pusher portions extending from the legs and lying flatly against the backing plates, and respective guide portions extending from the pusher portions and extending axially through the respective brakeshoe passage and housing passage.

Thus the pusher portions urge the brakeshoes axially apart and the guide portions guide the brakeshoes in the housing. The system of this invention therefore eliminates the use of separate elements for guiding the brakeshoes in the housing and returning them back after a braking operation.

According to another feature of this invention the spring is insulated from the housing and backing plate and a part of the pusher portion is engageable with the brake disk when the pad is worn to a thickness smaller than the axial dimension of the pusher portion. The brake of this invention further has means for making electrical connection with the spring. Thus, when the pad wears down to less than the axial dimension, the disk will engage and make electrical contact with the spring and ground same. The system of the instant invention can therefore use this spring also as the sensor element in the warning system for detecting pad wear.

In accordance with yet another feature of this invention, one of the housing passages is throughgoing and is counterbored to larger diameter on a side turned away from the disk. The warning means includes an electrical terminal carried on the spring in the counterbore of the one housing passage. The housing may also be provided in the housing passages with insulating sleeves axially slidably receiving the respective guide portions. In addition the brake pads are formed with radially outwardly open cutouts receiving the parts of the respective pusher portions that are engageable with the disk.

The spring, according to another feature of this invention, carries a contact element insulated from the housing and lying against the backing element. This contact element has a part engageable with the disk when the pad is worn down to a thickness less than the axial dimension of the element. Contact with this part of the contact element, which is normally a small plate having a hole traversed by the respective spring leg, will operate the warning device just like in the system described above.

In order to ensure that the brakeshoes do not become canted in the housing, the backing plate is formed with a bent-in tab. The pusher portion is engaged axially in one direction with the respective backing plate and axially in the opposite direction with the respective tab. Thus in effect the pusher portion twists the disk brake, pulling its radial inner portion out of engagement with the brake disk after a braking operation. This bent-in tab can project radially outwardly or even generally secantally of the respective backing plate relative to the axis, in which latter case the brakeshoe passage is formed as a secantally open slot.

According to a further inventive feature the housing includes a piston constituting part of the means and formed with one of the housing passages. The one housing passage and the respective guide portion are of complementary noncircular cross section. Normally polygonal section is used. This keeps the piston from rotating in the housing, thereby ensuring that the piston will bear evenly on the respective backing plate.

The spring according to this invention is formed of a substantially constant-diameter spring wire having a coil from which the legs extend. It is substantially symmetrical with a plane passing through the coil. Thus this spring can be made at very low cost, yet can be deformed readily enough when the brakeshoes are being changed.

DESCRIPTION OF THE DRAWING

The above and other features and advantages will become more readily apparent from the following, reference being made to the accompanying drawing in which:

FIG. 3a is an axial front view of a detail of FIG. 1;

FIG. 3b is a section taken along line IIIb—IIIb of FIG. 3a;

FIG. 4a is a view like FIG. 3a but showing a third embodiment of this invention;

FIG. 4b is a section taken along line IVb—IVb of FIG. 4a;

FIG. 5a is a view like FIG. 3a but showing a fourth embodiment of this invention;

FIG. 5b is a section taken along line Vb—Vb of FIG. 5a;

SPECIFIC DESCRIPTION

Figure 1:
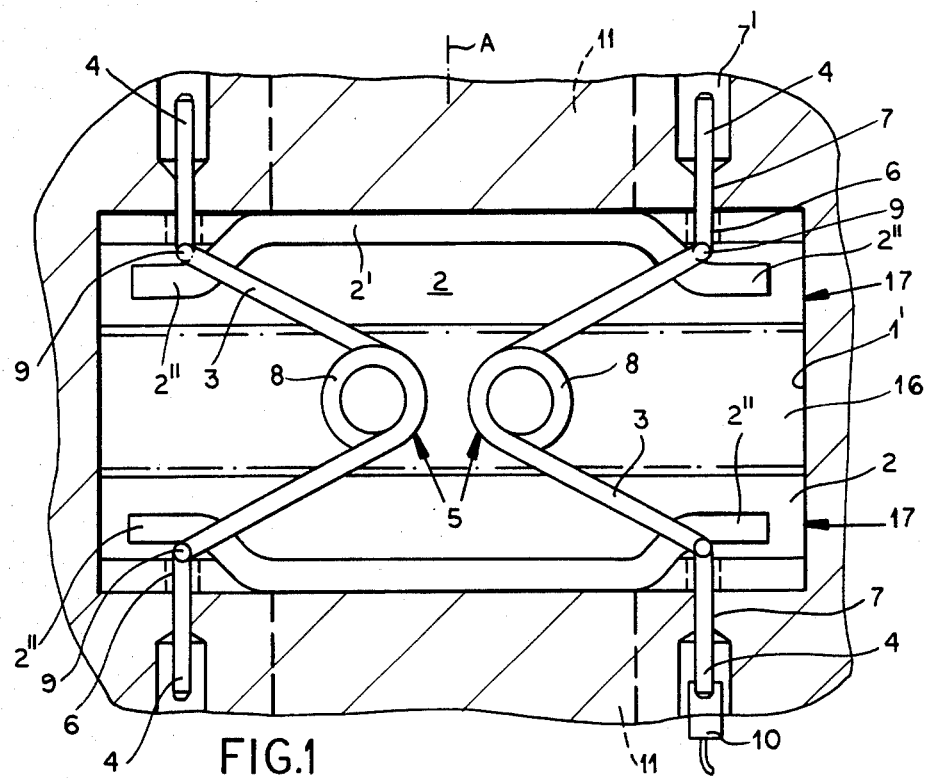
FIG. 1 is an axial section through the upper portion of a disk brake according to this invention.

As seen in FIGS. 1, 3a, and 3b a disk brake has a housing or caliper 1 engaged over the edge of a brake rotor shown in dot-dash lines at 16, this disk 16 being exposed in a shoe well 1' of the housing 1. A pair of standard brakeshoes 17 fit in this well 1' and each have a composition brake pad 2 and a steel backing plate 2'. A pair of confronting pistons 11 displaceable along an axis A parallel to the rotation axis of the rotor 16 can press the shoes 17 against the axially opposite faces of the disk 16 to arrest this disk 16 relative to the housing 1. This is standard disk-brake construction.

A pair of identical springs 5 serve to mount the shoes 17 on the housing 1, guide them for motion parallel to the axis A, and push them axially apart after a braking operation. To this end each of these springs 5 is made of a single piece of spring wire and each has a center coil 8 from which two legs 3 extend at an acute angle, the coil 8 and legs 3 lying generally in a plane parallel to but offset from the axis A and perpendicular to a radius drawn to this axis A. Extending secantally of the axis A from the outer end of each leg 3 is a pusher portion 9 that bears axially against the front face of the respective backing plate 2', while engaging axially forwardly against the back of a bent-forward tab 2" of this plate 2'. The pusher portions 9 are all parallel. Extending axially outwardly from the ends of the pusher portions 9 are guide portions 4 passing through respective bores 6 in the backing plates and into guide bores 7 in the housing 1. These guide bores 7 are counterbored at 7' to prevent the guide portions 4 from catching, and to permit an electrical terminal 10 to be secured to the end of one of the portions 4.

The wires forming the springs 5 are coated with an insulating material, or the bores 6 and 7 are lined with one. Thus if the disk 16 makes electrical contact with the springs 5 these springs will be grounded, at least when the metallic disk 16 wears through any insulating coating. Since such contact can only be made when the pad 2 is worn down to a thickness equal to the diameter of the wire of the springs 5, such grounding can be sensed to determine when the pads 17 should be changed.

FIG. 3b indicates how the portion 9, by pressing axially outwardly away from the disk 16 on the backing plate 2' and axially inwardly toward the disk 16 on the bent-in tab 2" of the plate 2' will inherently urge the back of the shoe 17 axially outwardly. Thus after a braking operation the radially inner portions of the pads 2 as well as the outer portions will be pulled away from the disk 16.

Figure 2:
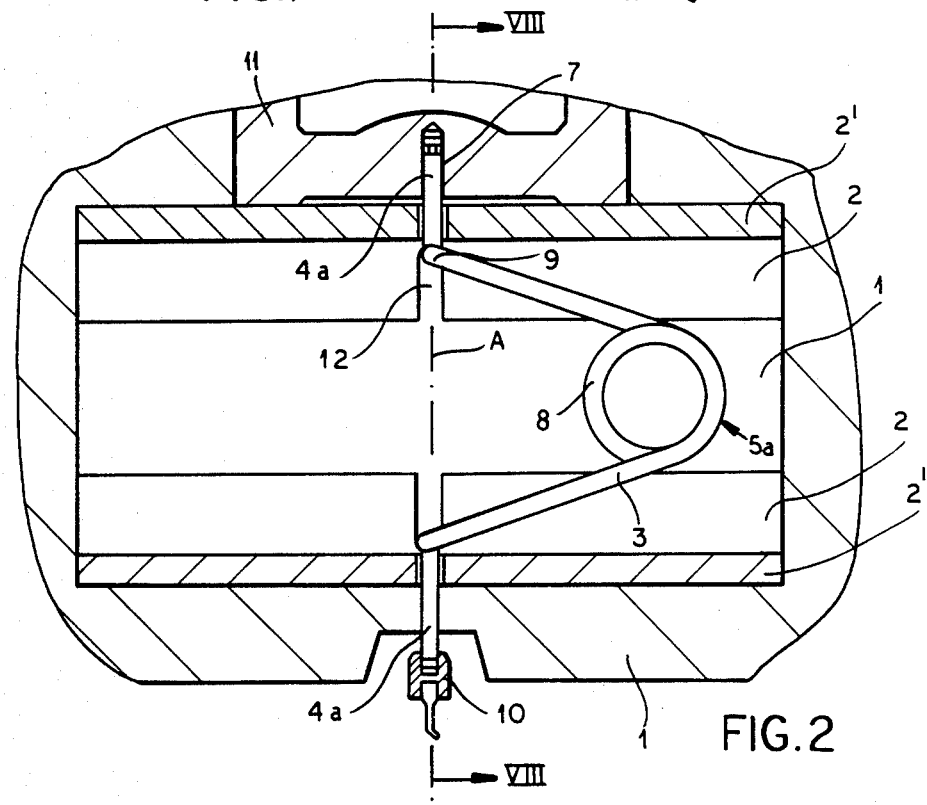
FIG. 2 is a view similar to FIG. 1 of a second embodiment of the brake of the instant invention.
Figure 8:
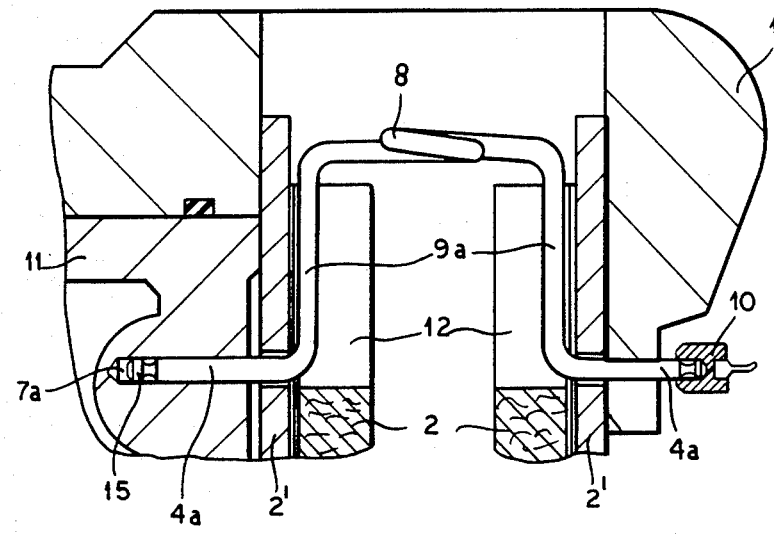

In FIGS. 2 and 8 an arrangement is shown wherein a single spring 5a is used which is substantially identical to the springs 5 of FIG. 1, but which has longer pusher portions 9a that lie in radial grooves 12 formed in the brake pads 2 and guide portions 4a received in guide bores 7a formed in the piston 11. In this arrangement only one such piston 11 is provided as is well known, with the entire housing 1 being shiftable axially so that the two shoes 17 will clamp the rotor 16 which is not shown in these figures. In addition the one guide portion 4a may be formed with a polygonal- or square-section portion 15 that fits within a portion of corresponding section of the bore 7a, so that the spring 5a will serve, in addition to its functions as support, guide, and return, to prevent rotation of the piston 11.

In FIGS. 4a and 4b the spring 5b has a guide portion 9b that is not straight, but is formed as a loop lying in a plane perpendicular to the axis A. In addition the hole 6b is formed as a slot so the spring 5b can be mounted on the shoe 17. The pad 2 is formed at the guide portion 9b with a radially outwardly open recess 18 into which this guide portion 9b extends. Thus as the pad 2 wears down it is possible for the disk 16, not shown in this figure, to engage it and make an electrical connection that can be sensed as described above. The use of a loop lying in a plane perpendicular to the axis A gives the spring 5b a solid seat on the backing plate 2'.

In FIGS. 5a and 5b the bent-in tabs 2" are replaced by an axially outwardly projecting tab 12 that lies in the plane of the backing plate 2'. Each leg 3c of the spring 5c is formed with a loop 19 lying in the same plane as the leg 3c and engaging around behind the tab 12. The tab 12 is of right-trapezoidal shape seen axially so that the loop 19 can be snapped tightly around it.

Figure 6:
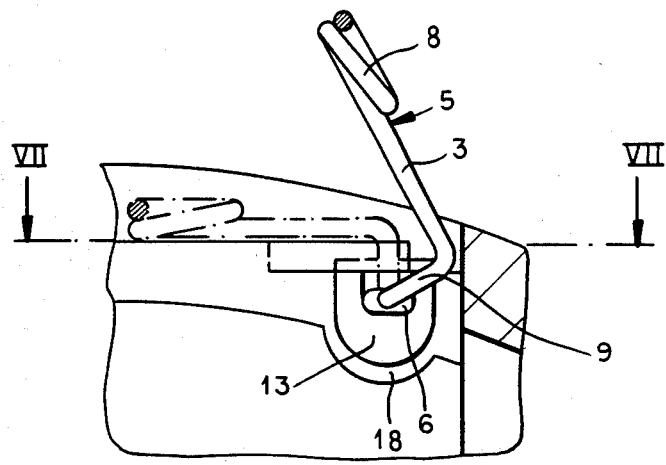
FIG. 6 is a view like FIG. 3a but showing a fifth embodiment of this invention.
Figure 7:
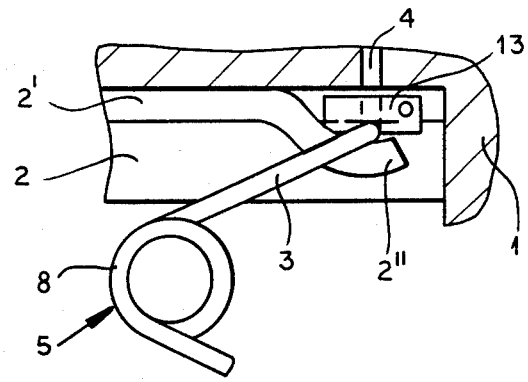
FIGS. 7 and 8 are sections taken respectively along lines VII—VII and VIII—VIII of FIGS. 6 and 2.

The arrangement of FIGS. 6 and 7 uses the same spring 5 of FIGS. 1, 3a, and 3b. It is provided at the lower end of its pusher portion 9 with a contact plate 13 that is insulated from it. The pad 2 again has a cutout 18 receiving part of this plate 13. Thus the brake disk 16 will contact this plate 13 when the pad 2 is badly worn, making an electrical connection that can be used to set off a warning device.

Figure 9:
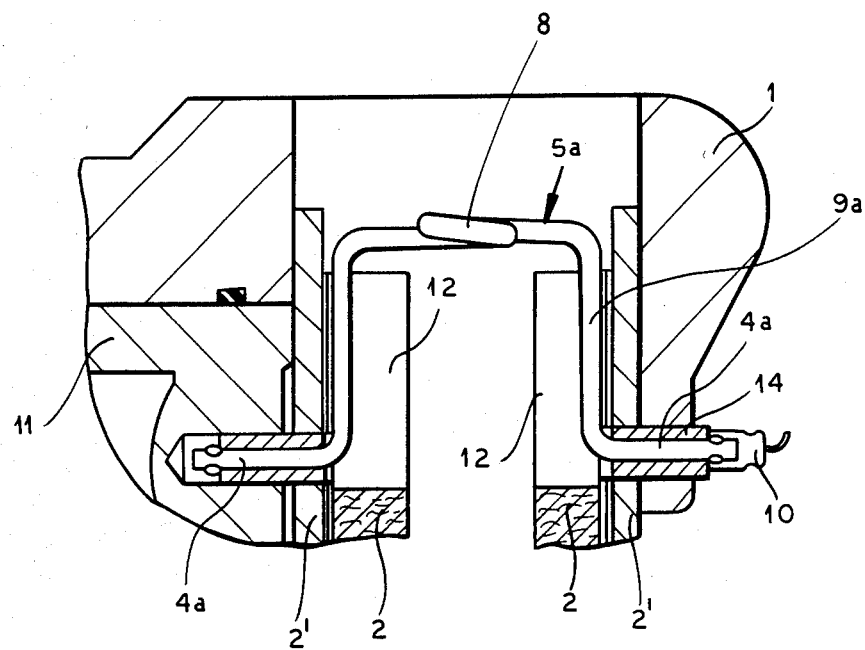
FIG. 9 is a view like FIG. 8 but showing a sixth embodiment of the present invention.

Finally FIG. 9 shows a system similar to that of FIGS. 2 and 8, but where the guide portions 4a are received in insulating sleeves 14 in the piston 11 and housing 1. In addition the ends of the portions 4a are formed with pinch tabs that project outwardly to hold the synthetic-resin sleeves in place and make mounting the terminal 10 easy. This arrangement prevents accidental grounding of the spring 5a which is insulated from the backing plates 2' by provision of a thin layer of the nonconductive pad material under its portions 9a in the bottoms of the grooves 12.

The system according to this invention therefore has a single and inexpensive machine element that serves the simultaneous functions of supporting and guiding the brakeshoes on the housing, returning them to their separated positions after a braking operation, and indicating when the pads are badly worn. The spring wire used is relatively thick, but sufficient deformability is ensured by the use of a coil 8 of more than 360°. To change the pads the two legs 3 are pinched together to withdraw the legs 4 from the holes 7, then the spring 5 with the shoes 17 are withdrawn from the well 1'. New shoes 17 are fitted to the spring 5 which is again pinched together to reinsert them. The arrangement is simple in the extreme and extremely easy to use.

We claim:

1. A disk brake comprising:
   a caliper housing adapted to fit over the edge of a brake disk rotatable about an axis;
   a pair of brakeshoes in said housing axially flanking said disk and each having a brake pad turned toward the respective face of said disk and a backing plate turned away therefrom and formed with a bent-in tab;
   means in said housing and engaging said backing plates for urging said brakeshoes together against said disk, said backing plates being formed with respective axially throughgoing brakeshoe passages and said housing being formed with respective housing passages in line with said brakeshoe passages; and
   a spring compressed axially between said brakeshoes and having
   respective legs extending toward said shoes,
   respective pusher portions extending from said legs, lying flatly against said backing plates, and engaged axially in one direction with the respective backing plate and axially in the opposite direction with the respective tab, and
   respective guide portions extending from said pusher portions and extending axially through the respective brakeshoe passage and housing passage, whereby said pusher portions urge said brakeshoes axially apart and said guide portions guide said brakeshoes in said housing.

2. The disk brake defined in claim 1 wherein said spring is insulated from said housing and backing plate, a part of said pusher portion being engageable with said brake disk when said pad is worn to a thickness smaller than the axial dimension of said pusher portion, said brake further comprising means for making electrical connection with said spring, whereby, when said pad wears down to less than said axial dimension, said disk will engage and make electrical contact with said spring and ground same.

3. The disk brake defined in claim 2 wherein one of said housing passages is throughgoing and is counterbored to larger diameter on a side turned away from said disk, said means including an electrical terminal carried on said spring in the counterbore of said one housing passage.

4. The disk brake defined in claim 2 wherein said housing is provided in said housing passages with insulating sleeves axially slidably receiving the respective guide portions.

5. The disk brake defined in claim 2 wherein said brake pad is formed with a radially outwardly open cutout receiving said part of said pusher portion.

6. The disk brake defined in claim 1 wherein said spring carries a contact element insulated from said housing and lying against said backing element, said contact element having a part engageable with said disk when said pad is worn down to a thickness less than the axial dimension of said element, said brake further comprising means for making electrical connection with said element, whereby, when said pad wears down to less than said axial dimension, said disk will engage and make electrical contact with said element.

7. The disk brake defined in claim 1 wherein said housing includes a piston constituting part of said means and formed with one of said housing passages, said one housing passage and the respective guide portion being of complementary noncircular cross section.

8. The disk brake defined in claim 1 wherein said spring is formed of a substantially constant diameter spring wire having a coil from which said legs extend.

9. The disk brake defined in claim 8 wherein said spring is substantially symmetrical with a plane passing through said coil.

* * * * *